July 19, 1960 W. A. REENSTRA ET AL 2,946,043

A.C. CODING SYSTEMS FOR MULTIPLE LOAD SELECTION

Filed Dec. 16, 1953 3 Sheets-Sheet 1

INVENTORS: W. A. REENSTRA
W. J. RITCHIE

BY [signature]

ATTORNEY

A.C. CODING SYSTEMS FOR MULTIPLE LOAD SELECTION

Filed Dec. 16, 1953 3 Sheets-Sheet 2

INVENTORS: W. A. REENSTRA
W. J. RITCHIE

BY [signature]

ATTORNEY

A.C. CODING SYSTEMS FOR MULTIPLE LOAD SELECTION

INVENTORS: W. A. REENSTRA
W. J. RITCHIE
BY [signature]
ATTORNEY

United States Patent Office 2,946,043

Patented July 19, 1960

2,946,043

A.C. CODING SYSTEMS FOR MULTIPLE LOAD SELECTION

Willard A. Reenstra, Rutherford, and Wesson J. Ritchie, Morris Plains, N.J., assignors to Bell Telephone Laboratories, Incorporated, New York, N.Y., a corporation of New York Filed Dec. 16, 1953, Ser. No. 398,589

8 Claims. (Cl. 340—147)

This invention relates to electrical information processing systems and in particular to apparatus for and a method of transmitting digital information.

A problem which frequently arises is that of sending coded information from one location to another using as few control leads as possible. Such a problem exists, for example, in telemetering systems, computer input and output devices, and in telephone systems where it is often advantageous to employ existing telephone pairs for the transmission of coded information without interfering with the direct current supervisory signals or the voice transmission of the talking path.

The prior art offers systems and methods for the remote transmission of digital information in which various coding schemes are employed to reduce the number of control leads required to transmit the desired information. In one known type of system the binary or two condition code is employed. In such systems, all information is expressed as a numerical sequence of a plurality of 0's or 1's in various permutation arrangements. Any individual element of such a code, therefore, consists of a 0 or 1. Such bi-valued code systems, having only two stable conditions to represent each element, are limited in the amount of information which can be sent over a given number of transmission lines.

A known variation of the binary coded system is the so-called two-out-of-five, or more general $m$-out-of-$n$ code, which enables transmission checking but which is also limited in information handling ability.

It is an object of this invention to provide a coding system which can provide a greater number of available codes with a given number of signaling leads than is possible with binary or direct current $m$-out-of-$n$ coding systems.

A further object of this invention is to provide an alternating current coding system in which the usual two condition input signal is replaced by a three condition input, namely, a signal of one phase, a signal of the opposite phase, and no signal.

Still another object of the present invention is to provide translating means for receiving alternating current coded information and producing a signal on the proper output lead.

The invention and its several novel features will be more fully appreciated from the following detailed description of various specific but illustrative embodiments. In the accompanying drawings.

In the instant coding system, an alternating current signal is applied to the information leads. This provides three possible input conditions, viz.:

(1) No signal (2) An alternating current signal of one given phase (3) An alternating current signal of a phase of 180° out of phase with the signal of condition 2.

Figure 1:
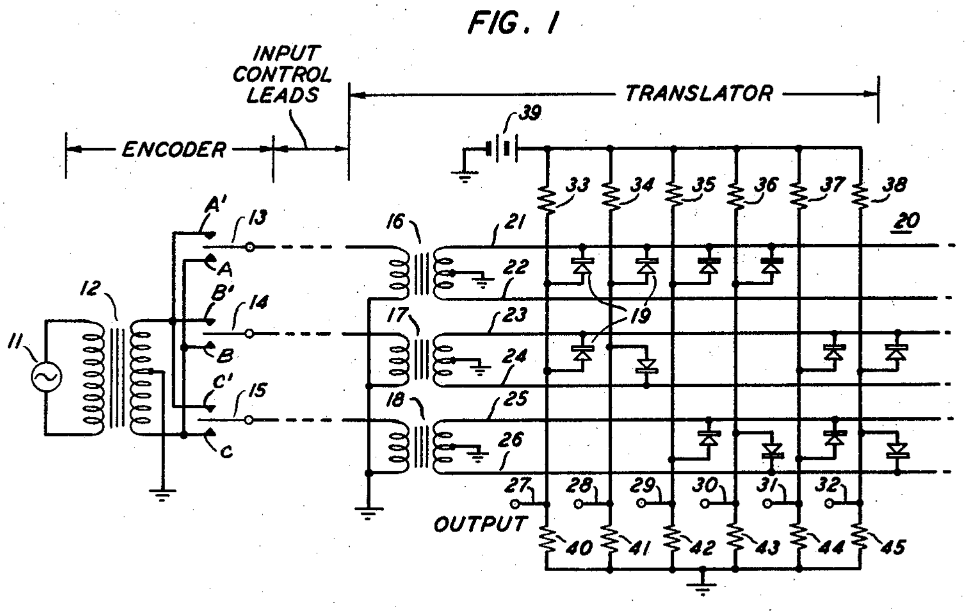
Fig. 1 is a diagram of one embodiment of the present invention wherein semiconductor diodes are employed in the translator.

These signals may be derived from encoder arrangements such as those shown in the drawings. Fig. 1 shows an alternating current source 11 connected to the primary winding of a transformer 12. One side of the secondary winding of transformer 12 is connected to the upper contacts A′, B′ and C′, and the other side of the secondary winding is connected to the lower contacts A, B and C, of switches 13, 14 and 15, respectively. The center-tap of the secondary winding of the transformer is connected to ground. The armatures of switches 13, 14 and 15 are connected to the primary windings of transformers 16, 17 and 18 respectively, the other side of said primary windings each being connected to ground. The secondary windings of transformers 16, 17 and 18 are connected to a rectangular diode matrix 20 wherein paired leads 21 and 22, connected to the secondary of transformer 16, paired leads 23 and 24, connected to the secondary of transformer 17 and paired leads 25 and 26, connected to the secondary of transformer 18, can be appropriately energized to select one of the several individual output leads 27 to 32, inclusive.

Output leads 27 to 32 are connected through their associated resistors 33 to 38, inclusive, to the positive terminal of a source of direct current potential 39, and have a common return line through their associated resistors 40 to 45 to the negative terminal of said potential source.

Matrix 20 includes multiple diodes 19, which advantageously are semiconductor rectifiers of compact, low-capacitance characteristics, interconnected between various ones of the paired leads 21 to 26 and the output leads 27 to 32. Matrices generally are networks wherein a number of pairs of control leads are interconnected to a larger number of individual output channels. Upon the energization of various combinations of the paired leads, all but one of the output channels can be disabled thus effecting a selection of a single channel. Various forms of diode matrices are known in the art and examples thereof are described in an article, "Rectifier Networks for Multiposition Switching," by D. R. Brown and N. Rochester at page 139 of volume 37 of The Proceedings of the Institute of Radio Engineers (February 1949).

In the circuit of Fig. 1, the semiconductor diodes are all so polarized as to present a minimum of resistance to negative potentials developed at the paired leads 21 to 26 in relation to ground. In like sense, positive potentials developed at the paired leads 21 to 26 would tend to bias the diodes to the high resistance part of their characteristics.

In the absence of any signal on the input control leads, all of the output leads will be at ground potential. This is due to the fact that the source of positive potential 39 connected through the resistors 33 to 38 so each of the diodes of the matrix will cause each diode to conduct, the circuit being completed through the secondary windings of the input transformers 16, 17 and 18 and ground. Since the resistance through the conducting diodes and the transformer secondary windings is comparatively low, the output leads are at substantially ground potential.

When coded information signals are placed on the input control leads, however, potential pulses will appear at selected output leads. For example, if the armatures of switches 13 and 14 were each connected to their top contacts, A′ and B′, the signals on the input leads to transformers 16 and 17 would be in phase. Thus the alternating current potentials on the leads 21 and 23, and on the leads 22 and 24 will also be in phase. The armature of switch 15 remains in the position shown, touching neither one of the contacts C or C′. Thus, neither of the leads 25 or 26 has any potential appearing thereon.

At the moment when leads 21 and 23 swing positive, leads 22 and 24 go negative. The diodes connected to leads 21 and 23 will cease to conduct since they will be biased to their high resistance state. The output lines connected to the non-conducting diodes, lines 27, 28, 29, 30, 31 and 32 with all attempt to rise to the potential of the positive voltage source 39. But since the lines 28, 29, 30, 31 and 32 are each still connected to conducting diodes, only the output line 27 will have a positive potential thereon. On the other half cycle of the alternating current signal, leads 21 and 23 swing negative while leads 22 and 24 go positive. The diodes connected to leads 21 and 23 will again conduct as they are polarized to present a minimum resistance to negative potentials. The diode connected to lead 24 ceases to conduct as it is biased to the high resistance state, but since the output line 28 connected to this diode is also connected to a conducting diode, line 28 like the other output lines will be at ground potential. Thus the operation of the switches to the above position has enabled the selection of one and only one of the plurality of output lines. Each of the other outputs may be selected by other switch combinations in a similar manner.

As has been shown, the input information is encoded into the three condition alternating current signals by the switches 13 to 15. The input control leads have a signal of one phase when the armature is in the upper position, a signal of the opposite phase when the armature is in the lower position, and no signal when the armature is in the middle. If "*m*" designates the number of input signal leads used at a time for each output code and "*n*" is the total number of input leads, the total number of output codes available from the circuit of Fig. 1 with the alternating circuit coding system will be $$2^{(m-1)}C_{n,m}=2^{(m-1)}\frac{n!}{m!(n-m)!} \qquad (1)$$

For example, if the three input leads of the circuit of Fig. 1 are used on a two-out-of-three basis, the following six codes may be produced:

*Table I*

| Input Code | Output |
|---|---|
| A′+B′ or A+B= | 0 |
| A′+B or A+B′= | 1 |
| A′+C′ or A+C= | 2 |
| A′+C or A+C′= | 3 |
| B′+C′ or B+C= | 4 |
| B′+C or B+C′= | 5 |

The usual self-checking codes such as the two-out-of-five, or more general *m*-out-of-*n* codes, produce a number of outputs.

$$C_{n,m}=\frac{n!}{m!(n-m)!} \qquad (2)$$

A comparison of Equation 1 with 2 will make it clear that the alternating current coding system of Fig. 1 in accordance with the instant invention will result in an output of $2^{(m-1)}$ times as many codes as were possible under the prior art system.

Figure 2:
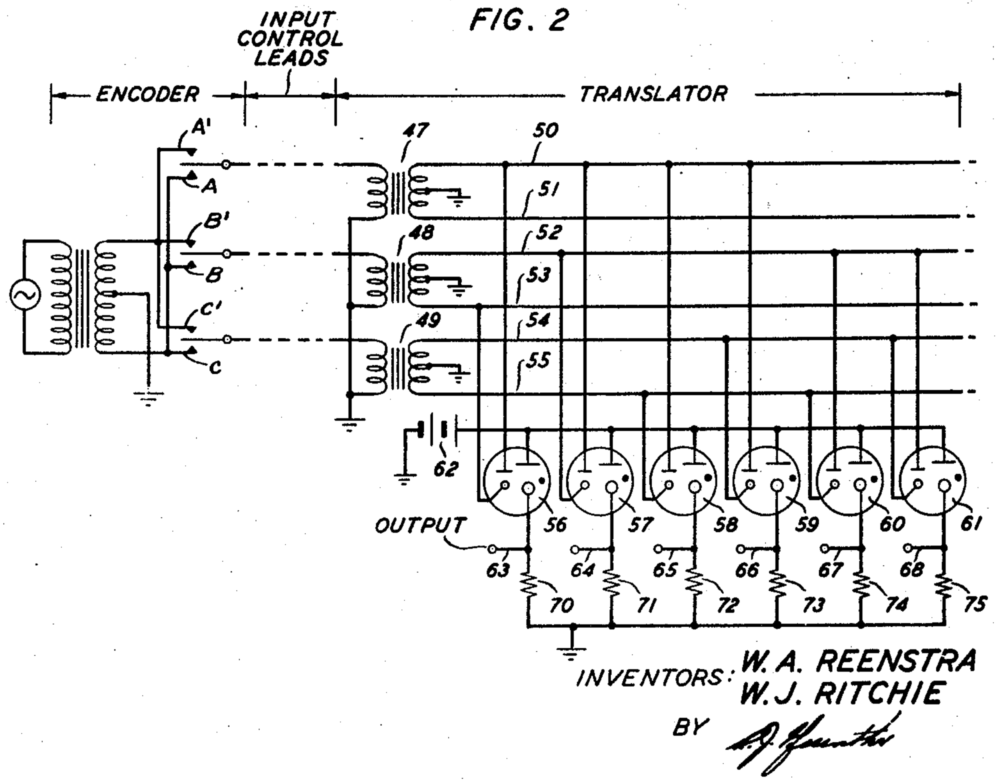
Fig. 2 is a diagram of a modification of Fig. 1 in which multi-element gas tubes are used in the translator.

Fig. 2 shows a modification of the circuit of Fig. 1 in which multi-element gas tubes are employed in the receiving end translator. Advantageously, the tubes may be tetrodes, such as the Western Electric 425A type. The gas tube circuit acts as a multi-input gate, as does the diode circuit, but has the advantage of requiring no power during the idle time. In the gas tube embodiment the circuit differs from the diode circuit of Fig. 1 primarily in the translator. As is shown in Fig. 2, the paired leads 50 to 55 connected to the secondary windings of the input transformers 47, 48 and 49, respectively, are connected to the starter electrodes of the gas tubes 56 to 61 in such fashion that the energization of the paired leads in the several combinations of Table II, below, will select a given output lead. The main gap anodes of the gas tubes 56 to 61, which advantageously may be cold cathode gas tetrodes, are connected in common to the positive terminal of a source of direct current voltage 62. The cathodes of said gas tubes are each connected to the output terminals 63 to 68, respectively, and are returned to the negative terminal of the direct current source 62 through their associated resistors 70 to 75.

As in the case of the diode translator, each combination of similarly phased input signals will select a single output terminal. For example, if in the circuit of Fig. 2, the input code is A′ and B′, the alternating current voltages on the input leads to transformers 47 and 48 will be in phase. There will be no alternating current voltage input to transformer 49 with this code. In the absence of signal inputs, none of the gas tubes 56 to 61 conducts due to the absence of starter gap potential. But with the above coded input, at the moment leads 50 and 52 swing positive, leads 51 and 53 go negative. Gas tube 56 has its starter anode connected to lead 50 and its starter cathode connected to lead 53. Since the former lead goes positive when the latter goes negative there is sufficient potential across the starter electrodes to fire tube 56 and to cause the main electrodes to conduct, thus producing a positive output potential on output terminal 63. Tube 57 will not fire since its starter electrodes are connected across leads 50 and 52, the voltages on which are in phase. Each of the remaining gas tubes has one of its starter electrodes connected to leads 54 or 55, neither of which are energized in the illustrative code chosen, and thus none are fired. On the other half cycle of the alternating current signal, leads 50 and 52 swing negative and leads 51 and 53 go positive. Under these conditions, there is negative potential on the starter anodes of each of the gas tubes 56 through 61 and none will conduct. Each of the remaining gas tubes may be selected and fired by other code settings of the switches in a similar manner. Thus it is clear that the gas tube translating circuit will operate in the alternating circuit coding system to select a desired one of a plurality of output terminals.

As in the case of the diode matrix receiving end translator, the total number of output codes available from the gas tube translator of Fig. 2 will be $$2^{(m-1)}C_{n,m}=2^{(m-1)}\frac{n!}{m!(n-m)!} \qquad (3)$$

If the input leads of the device of Fig. 2 are coded on a two-out-of-three basis, the following six codes are available:

*Table II*

| Input Code | Output |
|---|---|
| A′+B′ or A+B= | 0 |
| A′+B or A+B′= | 1 |
| A′+C′ or A+C= | 2 |
| A′+C or A+C′= | 3 |
| B′+C′ or B+C= | 4 |
| B′+C or B+C′= | 5 |

Thus it can be seen that the gas tube receiving end translator of Fig. 2, like the diode translator of Fig. 1, may be used to produce $2^{(m-1)}$ times as many codes as were possible with known direct current *m*-out-of-*n* coding schemes.

An examination of Tables I and II will show that two possible codes can be placed on the signaling leads of the devices of Figs. 1 and 2 for the selection of any given output lead. For example, the codes $A+B$ or $A'+B'$ both select the output 0, and $A'+B$ or $A+B'$ both select the output 1. This is due to the fact that the receiving end translator will only compare the phase present on the two energized signaling leads, giving one output for the signals which are in-phase and another output for the signals which are out-of-phase. Manifestly it is desirable to provide means to distinguish between signals which are in-phase with regard to one polarity and signals which are in-phase with regard to the other polarity. Such an arrangement would provide a far greater number of available output codes for the same number of input codes.

Figure 3:
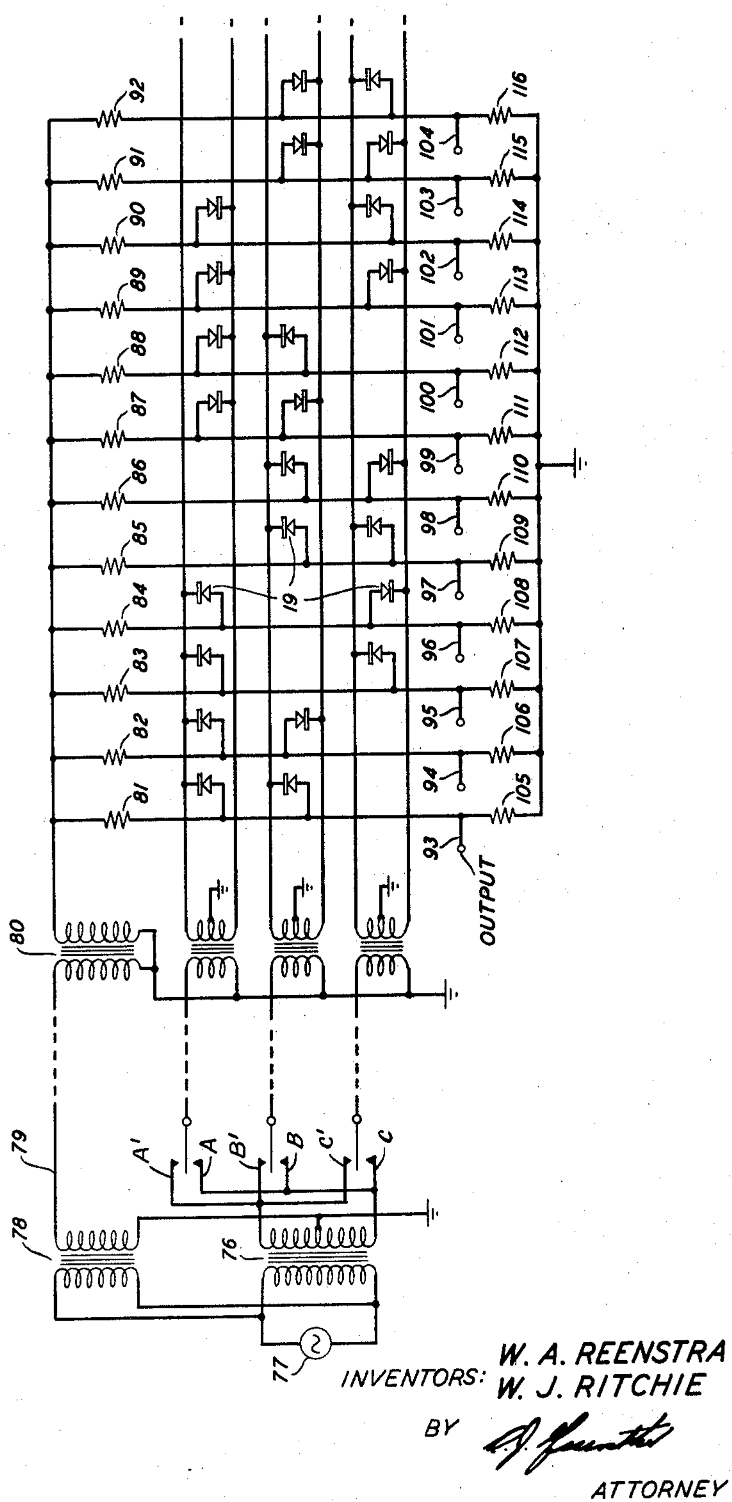
Fig. 3 is a diagram of another embodiment of the present invention in which a reference phase is employed to increase the number of output codes.
Figure 4:
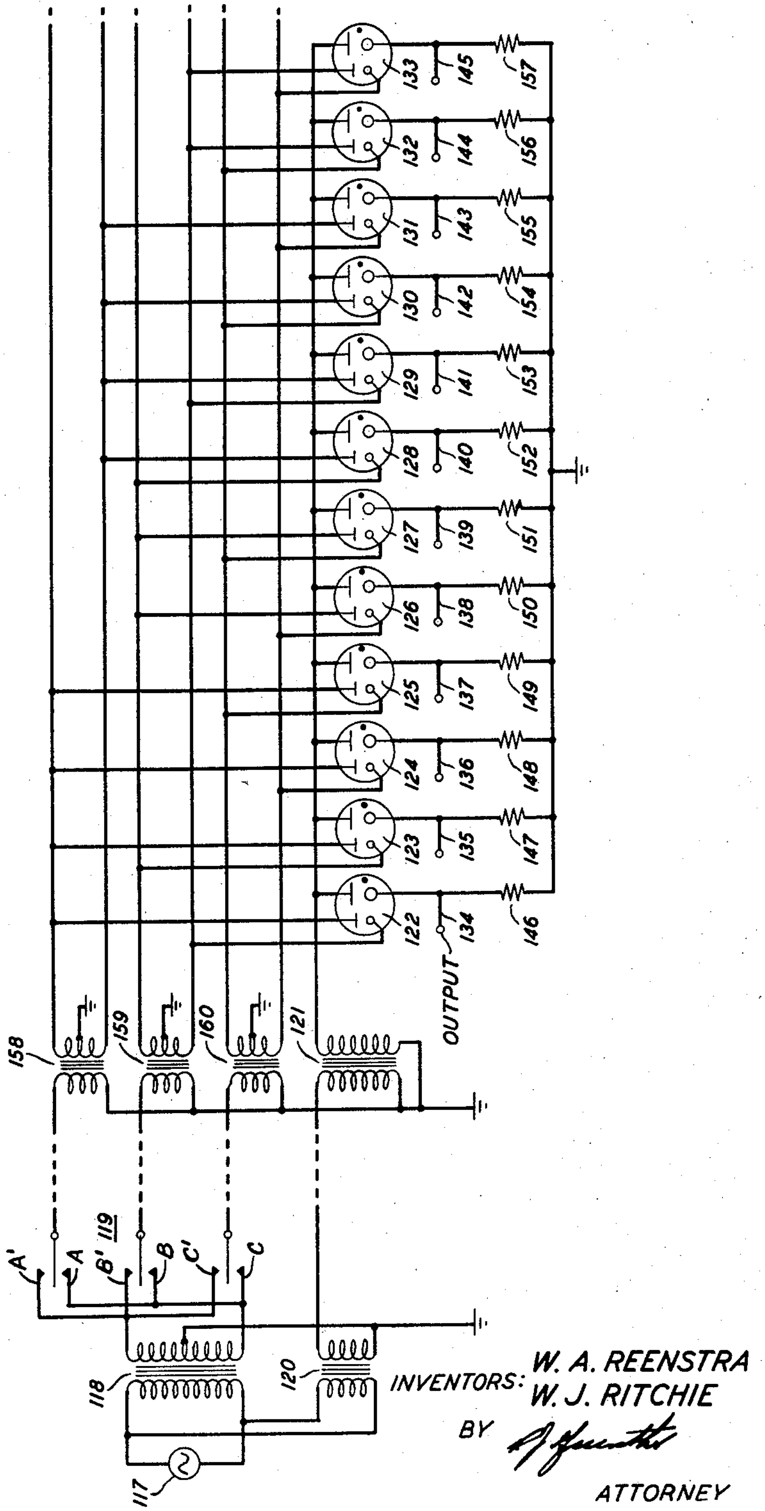
Fig. 4 depicts a modification of Fig. 3 using multi-element gas tubes instead of diodes.

The circuits of Figs. 3 and 4 show devices for accomplishing this desirable result. These circuits are modifications of the circuits of Figs. 1 and 2 in which the source of direct current voltage in the receiving end translator has been replaced by a standard or reference phase voltage so that the phase present on each energized signaling lead can be compared to the reference phase. This allows the detection of four codes on two signaling leads.

Fig. 3 shows a diode matrix receiving end translator which employs the alternating current coding system with the reference phase. In addition to being connected to the encoder transformer 76, the source of alternating current voltage 77 is connected to the primary of transformer 78. One end of the secondary winding of transformer 78 is connected through input lead 79 to one end of the primary winding of transformer 80. The other ends of the windings are connected to ground. The secondary of transformer 80 is connected to the resistors 81 to 92 which are, in turn, connected to the various diodes of the translator matrix, the output leads 93 to 104, respectively, and the output lead resistors 105 to 116. The output lead resistors are returned to ground, as is the other end of the secondary winding of the transformer 80. The reference phase matrix operates, in general, in a manner similar to that of the diode matrix circuit of Fig. 1 with the exception that the additional voltage supplied by the reference phase transformer, acts with the coded voltages upon the energized paired leads to block and unblock the conduction of the several diodes in the matrix to select a single input lead for each input code combination.

Fig. 4 shows a modification of the circuit of Fig. 3 in which the translator diodes have been replaced by multi-element gas tubes, which advantageously may be Western Electric 425A gas tetrodes. This circuit is basically similar to the alternating current coding circuit of Fig. 2 with the exception of the reference phase voltage which replaces the direct current voltage source of the latter circuit. The alternating current voltage source 117 is connected to the primary winding of the reference phase transformer 120 as well as to the transformer 118. The secondary winding of reference phase transformer 120 is connected to the primary winding of the reference phase input transformer 121, the secondary winding of which is connected to the main gap anodes of the multi-element gas tubes 122 to 133. The main gap cathodes of said gas tubes are connected to the output leads 134 to 145, respectively, and through their associated cathode resistors 146 to 157, respectively, to ground. The starter gap electrodes of said gas tubes are connected in the manner shown to the secondary windings of the translator input transformers. The provision of the reference phase voltage on the main gap electrodes of the gas tubes gives an additional selection factor for choosing a single output lead since the phase of the voltages present on each of the energized signaling leads may be compared to the reference phase.

The use of the reference phase voltage, as in the exemplary circuits of Figs. 3 and 4, will result in a total available number of codes, $$2^m C_{n,m} = 2^m \frac{n!}{m!(n-m)!} \tag{4}$$

Thus, the number of output codes available by circuits employing a reference phase voltage is equal to the number of combinations of $n$ things taken $m$ at a time, multiplied by a factor of $2^m$.

For example, if in the diode circuit of Fig. 3 or the gas tube circuit of Fig. 4, the signaling leads are coded on a two-out-of-three basis, the following codes are available:

*Table III*

| Input Code | Output |
|---|---|
| A+B= | 0 |
| A+B′= | 1 |
| A+C= | 2 |
| A+C′= | 3 |
| B+C= | 4 |
| B+C′= | 5 |
| A′+B′= | 6 |
| A′+B= | 7 |
| A′+C′= | 8 |
| A′+C= | 9 |
| B′+C′= | 10 |
| B′+C= | 11 |

It is clear that the alternating current coding system with the reference phase voltage has made twice as many codes available as were possible with the alternating current coding system alone, and $2^m$ times as many codes available as were possible with the direct current $m$-out-of-$n$ coding system. The value of this increase in the number of available output codes with a given number of signaling leads is obvious in information processing and transmission systems. When a given number of output codes is required, it is also clear that the receiving end translator will require fewer input signals than a binary translator. This means fewer diodes per gate with a semiconductor translator or fewer electrodes in a gas tube translator. An additional advantage of coding systems of this type is that the codes retain the self-checking feature found in the $m$-out-of-$n$ codes. With a checking circuit to detect $m$ signals at the receiving end translator it is possible to detect any single error in the received code.

In each of the representative circuits shown in the drawings and discussed hereinabove, the number of signal leads $m$ was two and the total number of signaling leads $n$ was three. These circuits are merely exemplary and represent a special case of a more general class of translating circuits where $m$ and $n$ can have any integral value, providing $m$ is equal to or less than $n$. It is to be understood that the above-discussed circuits are merely illustrative of the application of the principles of the invention. Numerous other arrangements may be devised by those skilled in the art without departing from the spirit and scope of the invention.

What is claimed is:

1. An alternating current digital information system comprising means for encoding input information into permutation code groups constructed from at least two elements each having one of three possible signaling conditions, namely, no signal, an alternating current signal of one given phase, and an alternating current signal of the opposite phase, and means responsive to said three possible signaling conditions, said signal responsive means comprising translating means for detecting in each code group elements of related phase for selecting an output representative of a particular code group of said elements of related phase, said translating means comprising a multi-input gate circuit of the type which is rendered operative only when at least two input conditions are met.

2. An alternating current operated coding system comprising means for encoding input information into permutation code groups constructed from at least two elements each having one of three possible signaling conditions, namely, an alternating current signal of a given phase, an alternating current signal of a phase opposite that of the given phase, and no signal, means for transmitting said code groups, means for receiving said code groups and comparing the phases of the elements of each code group to detect elements of related phase, said last-named means comprising a multi-input gate circuit for selecting an output representative of a particular code group of said elements of related phase.

3. An alternating current operated coding system comprising a source of alternating current voltage, a plurality of three position switches connected to said alternating current source to encode input information into code groups, each element of said code groups being an alternating current signal of one phase, an alternating current signal of the opposite phase, or no signal and each code group containing elements of at least two different types, multi-input gate means for detecting said signals of related phase, means for applying said code groups to said gate means, and means controlled by the detection in said gate means of signals of related phase in each code group for selecting an individual output.

4. An alternating current operated coding system comprising means to encode input information into alternating current code groups, each group having elements which may be an alternating current signal of one phase, an alternating current signal of a different phase, or no signal and each code group containing elements of at least two different types, means to supply a reference signal phase, means to compare the elements of each code group with each other and with the reference signal to detect elements of related phase, and means controlled by the comparison means to select an output representative of a particular code group of said elements of related phase.

5. An alternating current operated coding system comprising means for encoding input information into permutation groups constructed from at least two elements each having one of three possible signaling conditions, namely, no signal, an alternating current signal of a given phase, and an alternating current signal of the opposite phase, and diode matrix translating means for comparing the elements of each code group with each other for detecting in each said code group elements of similar phase for selecting an output representative of a particular code group of said elements of similar phase.

6. An alternating current operated coding system comprising means for encoding input information into permutation code groups constructed from at least two elements each having any one of three possible conditions, namely, no signal, an alternating current signal of a given phase, and an alternating current signal of a phase opposite that of said given phase, and gas tube translating means for detecting elements of related phase in each code group for selecting an output representative of a particular group of said elements of related phase.

7. An alternating current operated coding system in accordance with claim 5 further comprising means for transmitting an alternating current signal of a reference phase and means for applying said alternating current signal of reference phase to said diode matrix translating means.

8. An alternating current operated coding system in accordance with claim 6 further comprising means for providing an alternating current signal of a reference phase and means for applying said alternating current signal of reference phase to said gas tube translating means.

References Cited in the file of this patent

UNITED STATES PATENTS

| | | |
|---|---|---|
| 2,364,771 | Bascom | Dec. 12, 1944 |
| 2,424,585 | Simon | July 29, 1947 |
| 2,570,716 | Rochester | Oct. 9, 1951 |
| 2,614,167 | Kamm | Oct. 14, 1952 |
| 2,633,557 | Cabes | Mar. 31, 1953 |
| 2,657,272 | Dimond | Oct. 27, 1953 |
| 2,686,299 | Eckert | Aug. 10, 1954 |
| 2,760,132 | Pawley | Aug. 21, 1956 |

FOREIGN PATENTS

| | | |
|---|---|---|
| 667,630 | Great Britain | Mar. 5, 1952 |

OTHER REFERENCES

Publication: Title, Rectifier Networks for Multiposition Switching; Proceeding of I.R.E., February 1949, pages 139–147.